P. EVANS.
TRANSMISSION GEAR.
APPLICATION FILED APR. 5, 1906. RENEWED JUNE 30, 1908.
905,678.
Patented Dec. 1, 1908.
3 SHEETS—SHEET 1.
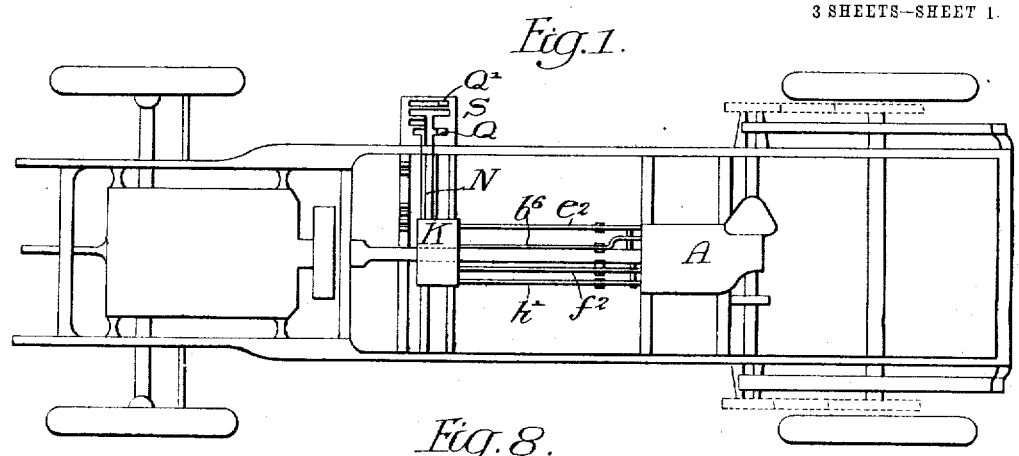
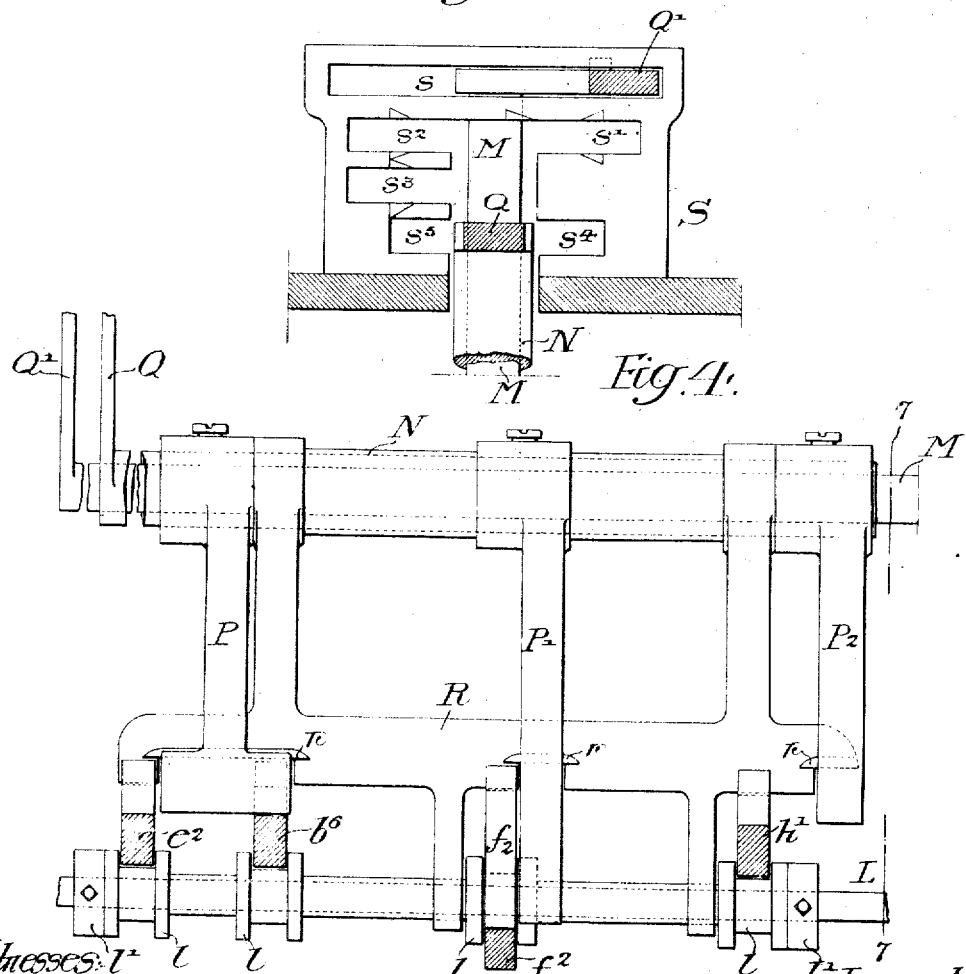

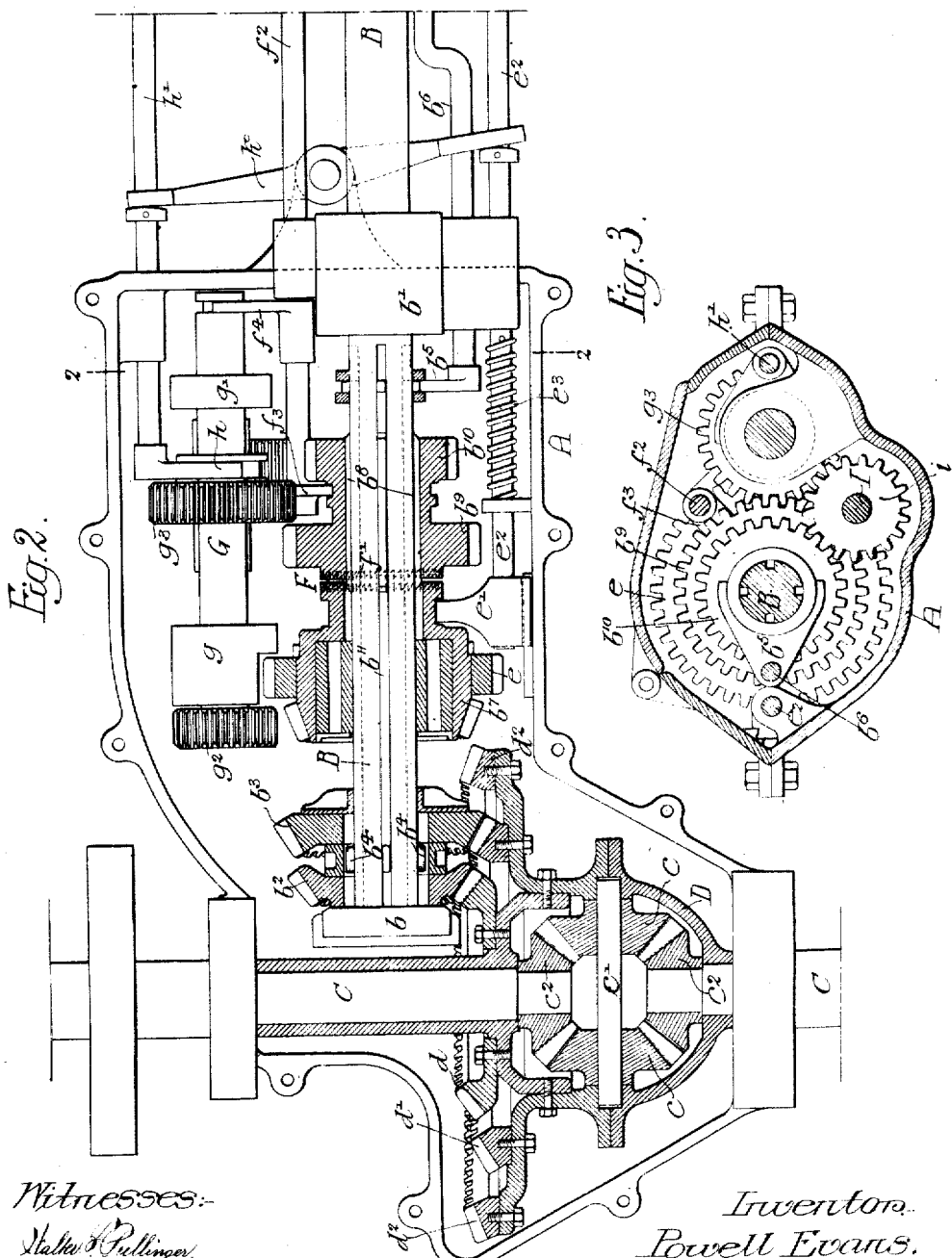

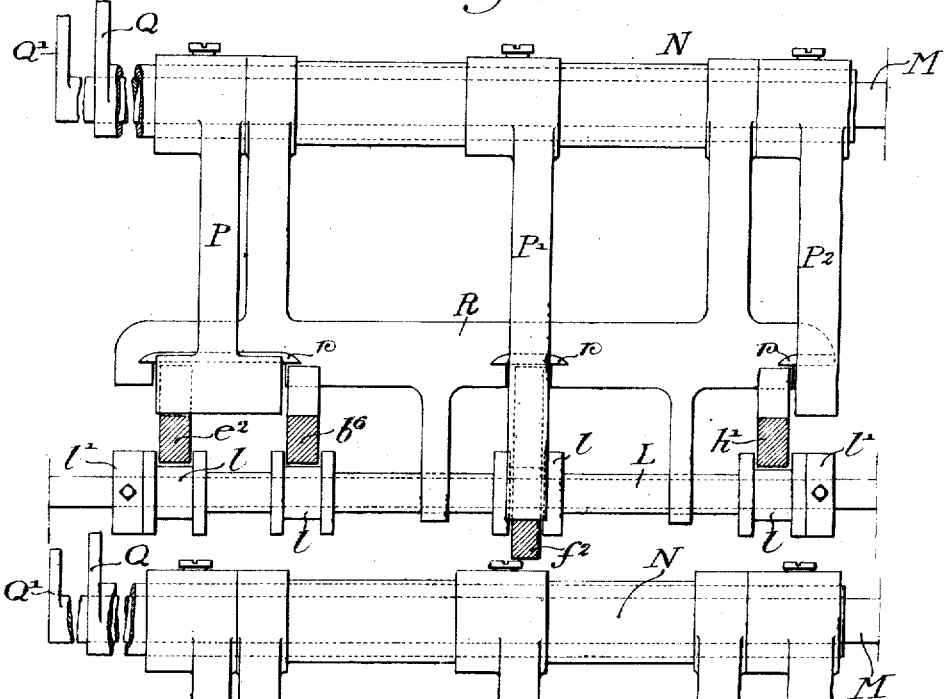
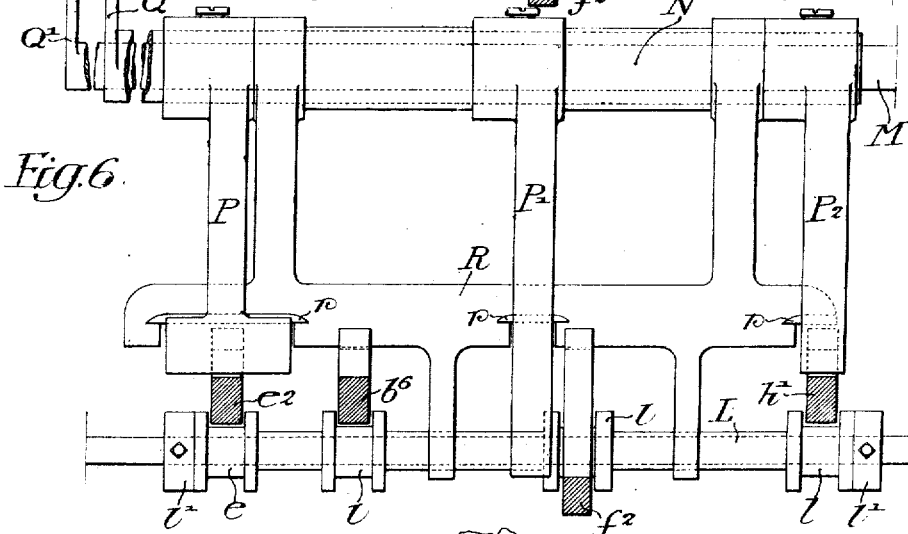
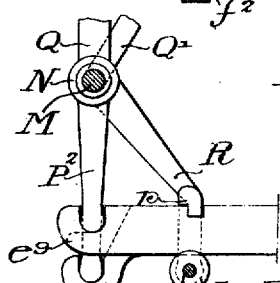

UNITED STATES PATENT OFFICE.

POWELL EVANS, OF PHILADELPHIA, PENNSYLVANIA.

TRANSMISSION-GEAR.

No. 905,678.  Specification of Letters Patent.  Patented Dec. 1, 1908.

Application filed April 5, 1906, Serial No. 310,148.  Renewed June 30, 1908.  Serial No. 441,244.

*To all whom it may concern:*

Be it known that I, POWELL EVANS, a citizen of the United States, residing in Philadelphia, Pennsylvania, have invented certain Improvements in Transmission - Gears, of which the following is a specification.

My invention relates to a novel form of gearing particularly designed to transmit power from a driving to a driven shaft, such for example, as those commonly employed in automobiles, which shall permit of the driven shaft being operated in one direction at any one of four speeds and in a reverse direction at a single speed, from a driving shaft operated at an approximately constant speed in one direction.

One object of the invention is to provide a transmission gear of the above type with its parts so arranged that they shall be few in number, light in weight, and of relatively small size for the transmission of a given power, the combination being such that the driving shaft shall for three of its speeds be directly connected to the engine shaft through suitable gears on each shaft, for the fourth speed driven from the engine shaft through a single auxiliary shaft, and for the reverse drive shall include the auxiliary shaft and a reverse gear supported on a third shaft.

I further desire to provide mechanism for controlling the speed changing apparatus which shall have but few parts, and shall be of such a nature as to be relatively reliable, durable and easy of operation; said mechanism including locking means for preventing accidental or improper operation of the gearing.

These objects and other advantageous ends I secure as hereinafter set forth, reference being had to the accompanying drawings, in which:

Figure 1, is a plan, to some extent diagrammatic, showing my invention as applied to an automobile; Fig. 2, is a horizontal section illustrating my improved transmission gear as designed for application to an automobile; Fig. 3, is a vertical section taken on the line 2—2, Fig. 2; Figs. 4, 5 and 6, are front elevations of the gear controlling mechanism, showing the positions occupied by the speed controlling lever and its associated apparatus corresponding to the various gear combinations for producing certain desired speeds of operation of the driven shaft; Fig. 7, is a vertical section taken on the line 7—7, Fig. 4, of the mechanism shown in said figure, and Fig. 8, is a plan partly in horizontal section showing the guide box for the speed controlling lever.

In the above drawings, A represents a suitable gear case into which extends a shaft B, directly connected to the engine and hereafter referred to as the driving shaft; there being also a shaft C at right angles to said shaft B and hereafter referred to as the driven shaft, which may itself serve as the rear axle on a Cardan drive or may drive the rear axle through chains. This latter shaft as is common in transmission systems of the type illustrated, is made in two parts operatively connected by differential gearing consisting in the present case of a pair of beveled pinions $c$, loosely carried upon a spindle $c'$, journaled in suitable bearings in the structure D and this last is revolubly carried within the gear case A upon the shaft C. The two pinions $c$ mesh with two other pinions $c^2$ fixed respectively to the two sections of the shaft C. The revoluble structure D has fixed to it three beveled racks $d$, $d'$ and $d^2$, so placed as to be concentric with the shaft C.

The shaft B, carried in suitable bearings $b$ and $b'$, has loosely mounted upon it near one end a pair of beveled gears $b^2$ and $b^3$ placed to permanently mesh with the beveled racks $d$ and $d'$ respectively. This shaft B is longitudinally slotted for the reception of four slidable keys $b^4$ connected by splines $b^{11}$ to a collar $b^5$, and constructed to enter key-ways in either of the beveled gears $b^2$ or $b^3$ to operatively couple the same to said shaft. The collar $b^5$ with its attached keys may be moved longitudinally along the driving shaft by means of a rod $b^6$ actuated in a manner hereinafter described. Also loosely carried upon the driving shaft B are two gears $b^7$ and $e$, either made integral or connected together as desired: the first being beveled so that it may suitably engage with the beveled rack $d^2$ when properly moved upon the shaft B by means of an arm $e'$ fixed to a sliding bar $e^2$ guided in the casing A. There is on this rod a spring $e^3$ whereby it is automatically returned to and maintained in such position that the gear $b^7$ is out of mesh with the rack $d^2$, except when said rod is forcibly held in its inner position so as to compress said spring. Said two gears $e$ and $b^7$ may at will be connected directly to the driving shaft B by means of a clutch F; one member $f$ of which is fixed to or forms part of the gear $e$, while the other member $f'$ is fixed to or forms a part of the coupled pinions $b^9$ and $b^{10}$ connected to the driving shaft, as indicated in dotted lines at $b^8$, by raised portions of the splines $b^{11}$ which connect the four keys $b^4$ to collar $b^5$. For the purpose of moving this latter member $f'$ of the clutch and the pinions $b^9$ and $b^{10}$, I provide a rod $f^2$ having an arm $f^3$ engaging said members.

An auxiliary shaft G is carried in the casing A parallel to the shaft B, being supported in bearings $g$ and $g'$ in which it is longitudinally movable under the action of a second arm $f^4$ connected to the rod $f^2$. This shaft has fixed to it a pinion $g^2$ capable of meshing with the gear $e$ and also has splined to it a gear $g^3$ slidable by means of an arm $h$ carried by the rod $h'$ which extends into the gear case in a manner similar to the rods $b^2$, $b^6$ and $f^2$. The gear $g^3$ is so placed that it may be moved into mesh either with the gear $b^9$, on the shaft B, or with a pinion $i$, carried upon a third or reverse shaft I, which is mounted in any desired manner within the gear case. This pinion $i$ meshes with the gear $b^{10}$ on the driving shaft B as long as said gear is in the position illustrated.

With the above parts occupying the positions illustrated, it will be seen that if power be applied to the shaft B, this will turn idly without driving any part of the structure D or the shaft C. To turn the shaft C at what I shall call the fourth speed, the rod $b^6$ is moved inwardly so as to bring the keys $b^4$ into the key-ways of the beveled pinion $b^2$, which is thus coupled to the driving shaft B and consequently turns the structure D and the shaft C. If the rod $b^6$ be moved outwardly so as to bring the keys $b^4$ into the key-ways of the pinion $b^3$, the structure D and the shaft B are operated at the third speed.

With the parts in the positions illustrated, the shaft C may be driven at the second speed by simultaneously moving inwardly the rods $e^2$ and $f^2$. This moves the beveled gear $b^7$ into engagement with the beveled rack $d^2$ and simultaneously brings the two clutch members $f$ and $f'$ into engagement with each other, so the gears $e$ and $b^7$ are directly coupled to the shaft B and consequently transmit power to the shaft C through structure D and the differential gearing.

It is to be noted that the inward movement of rod $f^2$, in addition to sliding gears $b^9$ and $b^{10}$ with one of the clutch members $f'$ on shaft B, also slides the shaft G in its bearings and keeps the gears $g^2$ and $e$ disengaged. For the first speed the rod $e^2$ is moved into its inner position so as to place the gear $b^7$ in mesh with the beveled rack $d^2$ and the rod $f^2$ is held in the position illustrated, so that the gear $g^2$ is in mesh with the gear $e$. Simultaneously by inward movement of the rod $h'$ the gear $g^3$ is moved upon the auxiliary shaft G into mesh with the gear $b^9$, so that power is transmitted to the structure D from the shaft B through gears $b^9$, $g^3$, shaft G, pinion $g^2$, gear $e$, beveled gear $b^7$, and beveled rack $d^2$.

In order to drive the shaft C in a direction the reverse of that above noted, it will be assumed that the various parts are in the positions illustrated in Fig. 1, so that it will be necessary to move the rod $e^2$ inwardly to cause the gear $b^7$ to mesh with the rack $d^2$ and at the same time bring the gear $e$ in mesh with the pinion $g^2$. The rod $h'$ is simultaneously moved outwardly so as to bring the gear $g^3$ in mesh with the pinion $i$, so that, as a consequence, power is transmitted to the structure D and to the shaft C from the shaft B to gear $b^{10}$, pinion $i$, gear $g^3$, shaft G, pinion $g^2$, gear $e$, beveled rack $b^7$ and rack $d^2$.

I preferably accomplish the above noted reversal by merely moving outwardly the rod $h'$; securing the simultaneous inward movement of the rod $e^2$ by means of a lever $k$ pivoted outside the casing A and engaging collars on said two rods. When the inwardly acting force applied to the rod $h'$ is removed this latter as well as the rod $e^2$ and their connected parts are returned to their neutral positions by the spring $e^3$.

From the above it will be seen that I am enabled to secure one reverse and four forward speeds for the shaft C with the use of but a relatively small number of gears; these being so arranged, moreover, that it is possible to secure the speeds desired without unduly increasing the diameters of the gears or objectionably enlarging the casing. It will, in addition, be noted that while I provide gearing capable of the above mentioned variations of speed, the number of gears turning idly at any time is reduced to a minimum.

In order to suitably actuate the rods $e^2$, $b^6$, $f^2$ and $h'$ to obtain the various combinations of gearing above described, I provide the apparatus shown in Figs. 1 and 4 to 8 inclusive, part of it being contained in a box K, Fig. 1. In these figures L is a fixed bar extending transversely of the machine and supported in any desired manner parallel to a transverse shaft M forming part of the ordinary brake mechanism.

The four rods $e^2$, $b^6$, $f^2$, and $h'$ extend to and are guided by flanged rollers $l$ on the bar L being properly spaced by means of sections of pipe placed on said bar between the rollers. Collars $l'$ are fixed to the bar against the outermost of the rollers $l$ for the purpose of maintaining the above noted apparatus in fixed positions thereon.

A tubular shaft N is placed on the shaft M and to it are fixed three arms P, P' and P² extending adjacent to the bar L. Said arms have their ends properly shaped to enter suitably shaped recesses in the rods $e^2$ $b^6$ $f$ and $h'$, it being noted that the arm P has a T-shaped head so that it may engage either of the bars $e^2$ or $b^6$ and that the arm P' is longer than the others so that it may engage the rod $f^2$ which is extended downwardly, as shown, for a reason hereafter set forth. While the rods $b^6$, $f^2$ and $h'$ are notched so that they may be moved longitudinally in both directions by an oscillatory movement of their engaging arms P, P' and P², the rod $e^2$ is cut away in front, as indicated in dotted lines at $e^9$ in Fig. 7, so that it is moved only when its arm P is swung to the rear.

The tubular shaft N with its attached arms may be rotated and also moved longitudinally by means of a hand lever Q and it has upon it a locking plate R designed to prevent movement of those of the four gear operating rods not actually used to effect any desired change of speed. Said plate slidably engages the bar L, though being, as shown, confined on the shaft N between arms P and P² it necessarily moves with the said shaft. It has in its lower edge certain definitely placed notches of such size as to permit the free longitudinal movement through them of the rods $e^2$, $b^6$, etc., which, however, are all notched so as to be immovably held except when the notches in the plate R are in such positions as to permit thereof. Said plate has, as shown in Fig. 7, flanges or lips $r$ just above each of its notches for the purpose of preventing upward movement of the rods when its notches are in line with said notches.

In order to guide the hand lever Q, as well as the brake lever Q' connected to the shaft M, I provide a guide gate S shown in Fig. 8, supporting it on the side of the automobile. This gate has one large slot $s$ for the brake lever Q' and another slot extending at right angles to the first for the lever Q. The latter slot permits movement of said lever parallel to itself—corresponding to a longitudinal movement of the shaft N on the shaft M and, in addition, has five slots $s'$, $s^2$, $s^3$, $s^4$, $s^5$ extending from said slot parallel to the slot $s$. Of these the slots $s'$ and $s^4$ extend to one side of the main slot, while the remainder extend to the opposite side.

With the above arrangement of parts, when it is desired to couple the gears for the fourth speed, the lever Q would be moved into the slot $s^5$ and as under these conditions the various arms are in the positions shown in Fig. 4, the rod $b^6$ is moved into the casing A to couple gears $d$ and $b^2$, since it is the only one of the rods engaged by any of the arms P. Moreover, the remaining rods $e^2$, $f^2$ and $h'$ are immovably locked in place by the plate R which is in engagement with the notches in all of said rods, the rod $b^6$ being free to move only because its notch corresponds to the notch in the plate. For the third speed the lever Q is moved from the slot $s^5$ to slot $s^4$, thereby partially rotating the shaft N and longitudinally moving the rod $b^6$ in a direction the reverse of that previously noted to couple gears $b^3$ and $d'$, the remainder of the rods being locked in position, as before noted. For the second speed the lever Q is first turned to its mid position and after being moved sidewise is placed in the slot $s^3$. These operations first move the plate R so as to bring two of its slots respectively opposite slots in the rods $e^2$ and $f^2$, at the same time moving the arms P and P' so that the ends of these respectively engage said unlocked rods, as shown in Fig. 5. The moving of the lever into slot $s^3$ then so turns the shaft N that the rods $e^2$ and $f^2$ are moved into the casing A, thus making the necessary combinations of gearing to secure the second speed. Since it is necessary in order to bring the two members of the clutch F into engagement that the rod $f^2$ be moved farther than the rod $e^2$, I provide for this by bending it down, as shown in the figures, and operating it by the arm P', which is of greater length than the others.

The combination of gears for the first speed is made by moving lever Q so as to slide the shaft N on shaft M till said lever is opposite the slot $s^2$ and then placing it in said slot. This action unlocks rods $e^2$ and $h'$, at the same time causing them to be engaged by the arms P and P² respectively, and then moves said rods into the casing A with the results desired and heretofore described.

The placing of lever Q in slot $s'$ moves the rod $h'$ outwardly, thereby causing inward movement of the rod $e^2$ through the medium of the lever $k$. It will be noted from Fig. 6 that the rod $e^2$ is still unlocked and has its end cut away to permit of this independent movement which, as previously noted, results in a reversal of the direction of rotation of the shaft C. When the lever Q is returned to its mid or neutral position the rod $e^2$ is automatically returned to its neutral position by the spring $e^8$.

I claim as my invention:

1. A transmission gear consisting of two shafts, a plurality of beveled gears fixed to one shaft, an equal number of beveled gears on the other shaft, certain of said latter gears meshing with certain of the gears on the first shaft and one being movable into and out of engagement with a gear on the first shaft, substantially as described.

2. A transmission gear consisting of two shafts, a plurality of beveled gears fixed to one shaft, an equal number of beveled gears on the other shaft, certain of said latter gears meshing with certain of the gears on the first shaft and one being movable into and out of engagement with a gear on the first shaft, with a clutch for connecting said movable gear to its shaft at will, substantially as described.

3. The combination in a transmission gear of two shafts, a plurality of bevel gears fixed to one shaft, a plurality of gears loose on the other shaft and in mesh with the gears on the first shaft, means for connecting any one of said loose gears to its shaft at will, two gears longitudinally movable upon the second shaft to bring one of them into or out of mesh with one of the bevel gears of the first shaft, a clutch for connecting the two movable gears to their shaft, an auxiliary shaft, two gears thereon, of which one is placed to mesh with the second one of said movable gears, a gear fixed to the second shaft and placed to engage the second gear on the auxiliary shaft, with means for operating the clutch, substantially as described.

4. The combination in a transmission gear of two shafts, a plurality of bevel gears fixed to one shaft, a plurality of gears loose on the other shaft and in mesh with the gears on the first shaft, means for connecting any one of said loose gears to its shaft at will, two gears longitudinally movable upon the second shaft to bring one of them into or out of mesh with one of the bevel gears of the first shaft, a clutch for connecting the two movable gears to their shaft, an auxiliary shaft, two gears thereon, a gear fixed to the second shaft and placed to engage the second gear on the auxiliary shaft, with means for operating the clutch and for longitudinally moving said auxiliary shaft, substantially as described.

5. A transmission gear having two shafts, a gear fixed to one shaft, a pair of gears longitudinally movable on the second shaft to bring one of them into or out of engagement with the gear of the other shaft, a clutch having one member fixed to said movable gears and having its second member splined to the second shaft, means for moving said two gears upon the shaft, and other means for moving the second member of the clutch into and out of engagement with its first member to connect said movable gears to their supporting shaft, with mechanism capable of coöperating with the second of the movable gears for varying the speed of the first shaft, substantially as described.

6. A transmission gear including two shafts, a gear fixed to one shaft, two gears connected together and longitudinally movable upon the second shaft, means for moving said gears to bring one of them into or out of mesh with the gear of the first shaft, a clutch having a member longitudinally movable upon the second shaft to connect said movable gears thereto, an auxiliary shaft, two gears thereon, an additional gear on the second shaft, and means for moving the gears of the auxiliary shaft to cause them to mesh respectively with one of the movable gears and with the additional gear on the second shaft, substantially as described.

7. A transmission gear including two shafts, a gear fixed to one shaft, two connected gears loose upon the other shaft, means for moving said two gears to cause one of them to mesh with the gear of the other shaft, means for directly connecting said two gears to the second shaft, and means independent of said direct connection for connecting at will the second movable gear to the shaft upon which it is mounted, substantially as described.

8. A transmission gear including two shafts, a gear fixed to one shaft, two connected gears loose upon the other shaft, means for moving said two gears to cause one of them to mesh with the gear of the other shaft, means for directly connecting said two gears to the second shaft, said gearing having parts independent of said direct means for connecting said movable gear to the shaft on which it is mounted, said gearing including means for turning said gear in the same direction as said shaft, and other means for turning it in the opposite direction, substantially as described.

9. A transmission gear including two shafts, a gear fixed to one shaft, two gears loose upon the other shaft, means for moving said two gears to cause one of them to mesh with the gear of the other shaft, means for directly connecting said two gears to the second shaft, and means independent of said direct connection for connecting at will the second movable gear to the shaft upon which it is mounted, with gearing independent of said movable gears for operatively connecting said first and second shafts, substantially as described.

10. A transmission gear including two shafts, a gear fixed to one of the shafts, and two longitudinally movable gears loose upon the other shaft, means for moving said two gears to bring one of them into mesh with the gear of the first shaft, an additional gear on the second shaft, an auxiliary shaft, two gears thereon, means for longitudinally moving said auxiliary shaft to throw one of its gears out of mesh with one of the gears of the second shaft, with means for moving the second gear of the auxiliary shaft to bring it into mesh with the additional gear of the second shaft, substantially as described.

11. A transmission gear including two shafts, a gear fixed to one of the shafts, two gears longitudinally movable on the second shaft to bring one of them into mesh with one of the gears on the first shaft, a clutch for directly connecting said two gears to the second shaft, an additional gear on said second shaft, an auxiliary shaft, two gears thereon, means for moving said auxiliary shaft to throw one of its gears out of mesh with one of the movable gears of the second shaft, and means for moving the second gear of the auxiliary shaft to bring it into mesh with the gear on the second shaft, substantially as described.

12. A transmission gear including two shafts, a gear fixed to one of said shafts, four gears on the second shaft, means for longitudinally moving two of said gears to bring one of them into mesh with the gear of the first shaft, means for directly connecting said two movable gears to the second shaft, an auxiliary shaft, two gears thereon, means for moving said latter shaft to throw one of said gears out of mesh with one of the movable gears of the second shaft, a third shaft having a gear meshing with one of the gears of the second shaft, and means for moving the second gear of the auxiliary shaft to bring it either into mesh with the fourth of the gears on the second shaft or with the gear on the third shaft, substantially as described.

13. The combination of a transmission gear including two shafts, a gear fixed to one of the shafts, three gears upon the second shaft, a clutch for connecting two of said gears directly to said second shaft, means for moving said gears on the shaft to bring one of them into mesh with the gear on the first shaft, an auxiliary shaft, a fixed and a loose gear thereon, means for longitudinally moving said auxiliary shaft to throw its fixed gear out of mesh with one of the two movable gears on the second shaft, means for sliding the loose gear of the auxiliary shaft to cause it to mesh with the third gear on the second shaft, and means for causing said two movable gears on the second shaft to be driven in a direction the reverse of that of said second shaft, substantially as described.

14. The combination in a transmission gear of two shafts, a plurality of bevel gears on one shaft, a plurality of bevel gears loose on the second shaft, of which certain are permanently in mesh with the gears on the first shaft, a key or keys for operatively connecting said permanently meshed gears to the second shaft at will, two sets of gears loose on the second shaft, means for moving two of said loose gears to cause one of them to mesh with a gear on the first shaft, a clutch for connecting at will said two movable gears to the second shaft, an auxiliary shaft and two gears thereon, with means for moving said gears into mesh with one of the movable gears of the second shaft and with the third gear on said shaft respectively, substantially as described.

15. The combination of a driving and a driven shaft, gearing for connecting the same, a plurality of rods for actuating said gearing to cause the driving shaft to operate the driven shaft at any of a number of speeds, an operating shaft having arms capable of engaging said rods, with a lever capable of turning said shaft and moving it longitudinally, substantially as described.

16. The combination of a driving and a driven shaft, gearing for connecting the same, a plurality of rods for actuating said gearing to cause the driving shaft to operate the driven shaft at any of a number of speeds, an operating shaft having arms capable of engaging said rods, a lever for turning said shaft and for moving it longitudinally, and a gate constructed to guide and hold said lever in any of a plurality of positions, substantially as described.

17. The combination of a driving and a driven shaft, gears for connecting said shafts, a plurality of longitudinally movable rods for connecting said gears in different combinations, a rotatable and longitudinally movable shaft extending transversely of the rods, a plurality of arms on said shaft movable into and out of engagement with the rods, one of said arms being capable of engaging its rod at a point farther from the operating shaft than the points of engagement of the other arms and rods, with a lever for operating said shaft, substantially as described.

18. The combination of a driving and a driven shaft, gears for connecting said shafts, a plurality of rods for connecting said gears in different combinations, a shaft extending transversely of the rods, arms thereon, means for moving said shaft on its axis and also longitudinally thereof, with a locking plate movable with said shaft and constructed to engage the rods, said plate being constructed to prevent movement of the rods when it is in certain definite positions, substantially as described.

19. The combination of a driving and a driven shaft, gears for connecting said shafts, a plurality of longitudinally movable rods for connecting said gears in different combinations, a spring for returning one of the rods to a definite position after it has been displaced therefrom, a single lever for actuating the rods, means for mechanically connecting the rod having the spring with another one of the rods, whereby said two rods are caused to move in opposite directions, substantially as described.

20. The combination of a driving and a driven shaft, gears for connecting said shafts, a plurality of longitudinally movable rods for connecting said gears in different combinations, a rotatable and longitudinally movable shaft extending transversely of the rods, arms carried by said shaft and constructed to fit recesses in the rods, one of said arms being capable of engaging a plurality of the rods, substantially as described.

21. The combination of a driving and a driven shaft, gears for connecting said shafts, a plurality of longitudinally movable rods for connecting said gears in different combinations, a rotatable and longitudinally movable shaft extending transversely of the rods, arms carried by said shaft and constructed to fit recesses in the rods, with a notched plate movable with the shaft and operative in notches in the rods, and means for operating said shaft, substantially as described.

22. The combination of a driving and a driven shaft, gears for connecting said shafts, a plurality of substantially parallel rods for connecting said gears in different combinations, a longitudinally movable and rotatable shaft extending transversely of the rods, arms fixed to the shaft with spaces between them different from the spaces between the rods, said arms being movable into engagement with the rods when their supporting shaft is properly moved, with means for actuating said shaft, substantially as described.

23. The combination of a driving and a driven shaft, gears for connecting said shafts, a series of substantially parallel rods for connecting said gears in different combinations, a series of arms movable transversely to the rods and fixed thereon at distances apart different from the distances between the rods, a locking device for holding those rods immovable which are not engaged by the arms, and a device for simultaneously actuating the arms and the locking device, substantially as described.

24. The combination of a driving and a driven shaft, gears for connecting said shafts, rods for connecting the gears in different combinations, a shaft connectible at will to a rod or rods and movable both longitudinally and axially, a single lever for actuating said shaft, with a gate having a central slot and transverse slots extending therefrom for the reception of the lever, substantially as described.

In testimony whereof, I have signed my name to this specification, in the presence of two subscribing witnesses.

POWELL EVANS.

Witnesses:
A. RAGGI,
J. QUAGLIOTTI.